United States Patent
Wang et al.

(10) Patent No.: US 11,380,026 B2
(45) Date of Patent: *Jul. 5, 2022

(54) METHOD AND DEVICE FOR OBTAINING PREDICTED IMAGE OF TRUNCATED PORTION

(71) Applicant: GE Precision Healthcare LLC, Wauwatosa, WI (US)

(72) Inventors: Xueli Wang, Beijing (CN); Bingjie Zhao, Beijing (CN); Shiyu Li, Beijing (CN); Dan Liu, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,668

(22) Filed: May 5, 2020

(65) Prior Publication Data

US 2020/0357150 A1 Nov. 12, 2020

(30) Foreign Application Priority Data

May 8, 2019 (CN) .......................... 201910380182.2

(51) Int. Cl.
*G06T 11/00* (2006.01)

(52) U.S. Cl.
CPC .......... *G06T 11/005* (2013.01); *G06T 11/006* (2013.01); *G06T 2210/41* (2013.01)

(58) Field of Classification Search
CPC .... G06T 11/003; G06T 11/005; G06T 11/006; G06T 11/008; G06T 2207/20081; G06T 2207/20084; G06T 2211/432; G01N 23/046; A61B 6/032; A61B 6/5258

See application file for complete search history.

(56) References Cited

U.S. PATENT DOCUMENTS

| | | |
|---|---|---|
| 5,937,102 A | 8/1999 | Jin |
| 6,577,700 B1 | 6/2003 | Fan et al. |
| 7,860,341 B2 | 12/2010 | Star-Lack et al. |
| 8,705,828 B2 | 4/2014 | Yang et al. |
| 2009/0220167 A1* | 9/2009 | Vaz et al. .............. G06T 11/001 382/260 |
| 2012/0155736 A1* | 6/2012 | Faul et al. ............. A61B 6/032 382/131 |

(Continued)

FOREIGN PATENT DOCUMENTS

| | | |
|---|---|---|
| CN | 108122265 A | 6/2018 |
| WO | 2017223560 A1 | 12/2017 |

OTHER PUBLICATIONS

EP application 20173339.1 filed May 6, 2020—extended Search Report dated Jul. 28, 2020, 8 pages.

(Continued)

*Primary Examiner* — Andrew W Johns

(57) ABSTRACT

The present application provides a method and device for obtaining a predicted image of a truncated portion, an imaging method and system, and a non-transitory computer-readable storage medium. The method for obtaining a predicted image of a truncated portion comprises preprocessing projection data to obtain, by reconstruction, an initial image of the truncated portion; and calibrating the initial image based on a trained learning network to obtain the predicted image of the truncated portion.

12 Claims, 8 Drawing Sheets

(56) References Cited

U.S. PATENT DOCUMENTS

| | | | |
|---|---|---|---|
| 2012/0275673 A1* | 11/2012 | Star-Lack et al. | G06T 11/005 382/131 |
| 2013/0294568 A1* | 11/2013 | Lee et al. | A61B 6/025 378/4 |
| 2014/0126784 A1 | 5/2014 | Hsieh et al. | |
| 2018/0018757 A1 | 1/2018 | Suzuki | |
| 2018/0018796 A1 | 1/2018 | Chen et al. | |
| 2018/0144214 A1 | 5/2018 | Hsieh et al. | |
| 2019/0328348 A1 | 10/2019 | De Man et al. | |

OTHER PUBLICATIONS

Enc Fournie et al: "CI Field of View Extension Using Combined Channels Extension and Deep Learning Method", International Conference on Medical Imaging with Deep Learning—Review Paper, Apr. 17, 2019 (Apr. 17, 2019), pp. 1-4, XP055712606, London, United Kingdom Retrieved from the Internet: URL:https://openreview.net/forum?id=SygfANaVcN [retrieved—on Jul. 7, 2020].
JP application 2020-078001 filed Apr. 27, 2021—Office Action dated Sep. 14, 2021; Machine Translation generated Sep. 15, 2021; 5 pages.

* cited by examiner

METHOD AND DEVICE FOR OBTAINING PREDICTED IMAGE OF TRUNCATED PORTION

CROSS-REFERENCE TO RELATED APPLICATIONS

This application claims the benefit of French Patent Application No. 201910380182.2 filed on May 8, 2019, the disclosure of which is herein incorporated by reference in its entirety.

TECHNICAL FIELD

The present invention relates to image processing, and in particular, to a method and device for obtaining a predicted image of a truncated portion, an imaging method and system, and a non-transitory computer-readable storage medium.

BACKGROUND

In the process of computed tomography (CT), a detector is used to acquire data of X-rays passing through a detected object, and then the acquired X-ray data is processed to obtain projection data. Such projection data may be used to reconstruct a CT image. Complete projection data can be used to reconstruct an accurate CT image for diagnosis.

However, if the detected object has a large size or is placed in a special position, some portions of the detected object will exceed a scanning field, and thus the detector will be unable to acquire complete projection data. This issue is referred to as data truncation. Typically, projection data or an image of a truncated portion may be predicted through some mathematical models, for example, a water model. However, image quality of the truncated portion obtained by such conventional methods varies according to actual situations, hence performance is not optimal.

SUMMARY

The present invention provides a method and device for obtaining a predicted image of a truncated portion, an imaging method and system, and a non-transitory computer-readable storage medium.

An exemplary embodiment of the present invention provides a method for obtaining a predicted image of a truncated portion, the method comprising preprocessing projection data to obtain, by reconstruction, an initial image of the truncated portion; and calibrating the initial image based on a trained learning network to obtain the predicted image of the truncated portion.

Optionally, the preprocessing projection data comprises padding the truncated portion of the projection data. Furthermore, the padding the truncated portion of the projection data comprises padding the truncated portion with projection data information at a boundary of an untruncated portion. Furthermore, the padding the truncated portion with projection data information at a boundary of an untruncated portion comprises padding a truncated portion of each channel with projection data information at a boundary of an untruncated portion of the corresponding channel.

Optionally, the calibrating the initial image based on a trained learning network to obtain the predicted image of the truncated portion comprises converting pixels of the initial image of the truncated portion from polar coordinates to rectangular coordinates, to obtain a pixel matrix of the initial image; calibrating the pixel matrix based on the trained learning network; and converting the calibrated pixel matrix from rectangular coordinates to polar coordinates, to obtain the predicted image of the truncated portion.

Optionally, the trained learning network is obtained by training based on a virtual distorted image and a comparison image. Furthermore, the trained learning network is obtained by training based on a pixel matrix of the virtual distorted image obtained by coordinate transformation and a pixel matrix of the comparison image obtained by coordinate transformation. Further, a method for obtaining the virtual distorted image and the comparison image comprises receiving an original image without data truncation; virtually offsetting a portion of the original image corresponding to a target object to move it partially out of a scanning field, so as to obtain the comparison image; performing virtual scanning and virtual data acquisition on the comparison image to generate virtual truncated projection data; and performing image reconstruction on the virtual truncated projection data to obtain the virtual distorted image. Optionally, a method for obtaining the virtual distorted image and the comparison image comprises: receiving an original image without data truncation, the original image being used as the comparison image; keeping the original image within a scanning field, and performing orthographic projection on the original image to obtain a projection of the original image; padding channels on two sides of the projection to generate virtual truncated projection data; and performing image reconstruction on the virtual truncated projection data to obtain the virtual distorted image.

An exemplary embodiment of the present invention further provides an imaging method, the imaging method comprising obtaining a predicted image of a truncated portion; and splicing the predicted image of the truncated portion with an untruncated portion image reconstructed according to original projection data, so as to obtain a medical image, wherein the obtaining a predicted image of a truncated portion comprises preprocessing projection data to obtain, by reconstruction, an initial image of the truncated portion; and calibrating the initial image based on a trained learning network to obtain the predicted image of the truncated portion.

An exemplary embodiment of the present invention further provides a non-transitory computer-readable storage medium, for storing a computer program, wherein when executed by a computer, the computer program causes the computer to execute instructions of the method for obtaining a truncated portion image described above.

An exemplary embodiment of the present invention further provides a device for obtaining image prediction of a truncated portion, the device comprising a preprocessing device and a control device. The preprocessing device is configured to preprocess projection data to obtain, by reconstruction, an initial image of the truncated portion. The control device is configured to calibrate the initial image based on a trained learning network to obtain the predicted image of the truncated portion.

Optionally, the preprocessing device comprises a padding module, the padding module being configured to pad the truncated portion of the projection data. Further, the padding module is further configured to pad the truncated portion with projection data information at a boundary of an untruncated portion.

Optionally, the control device comprises a transformation module, a calibration module, and an inverse transformation module, wherein the transformation module is configured to convert pixels of the initial image of the truncated portion from polar coordinates to rectangular coordinates, to obtain a pixel matrix of the initial image; the calibration module is configured to calibrate the pixel matrix based on the trained learning network; and the inverse transformation module is configured to convert the calibrated pixel matrix from rectangular coordinates to polar coordinates, to obtain the predicted image of the truncated portion.

An exemplary embodiment of the present invention further provides an imaging system, the system comprising the device for obtaining image prediction of a truncated portion described above and a splicing device. The device for obtaining image prediction of a truncated portion comprises a preprocessing device and a control device. The preprocessing device is configured to preprocess projection data to obtain, by reconstruction, an initial image of the truncated portion. The control device is configured to calibrate the initial image based on a trained learning network to obtain the predicted image of the truncated portion. The splicing device is configured to splice the predicted image of the truncated portion with an untruncated portion image reconstructed according to projection data, so as to obtain a medical image.

Other features and aspects will become clear through the following detailed description, accompanying drawings, and claims.

BRIEF DESCRIPTION OF THE DRAWINGS

The present invention may be better understood by describing exemplary embodiments of the present invention with reference to accompanying drawings, wherein.

DETAILED DESCRIPTION

Figure 1:
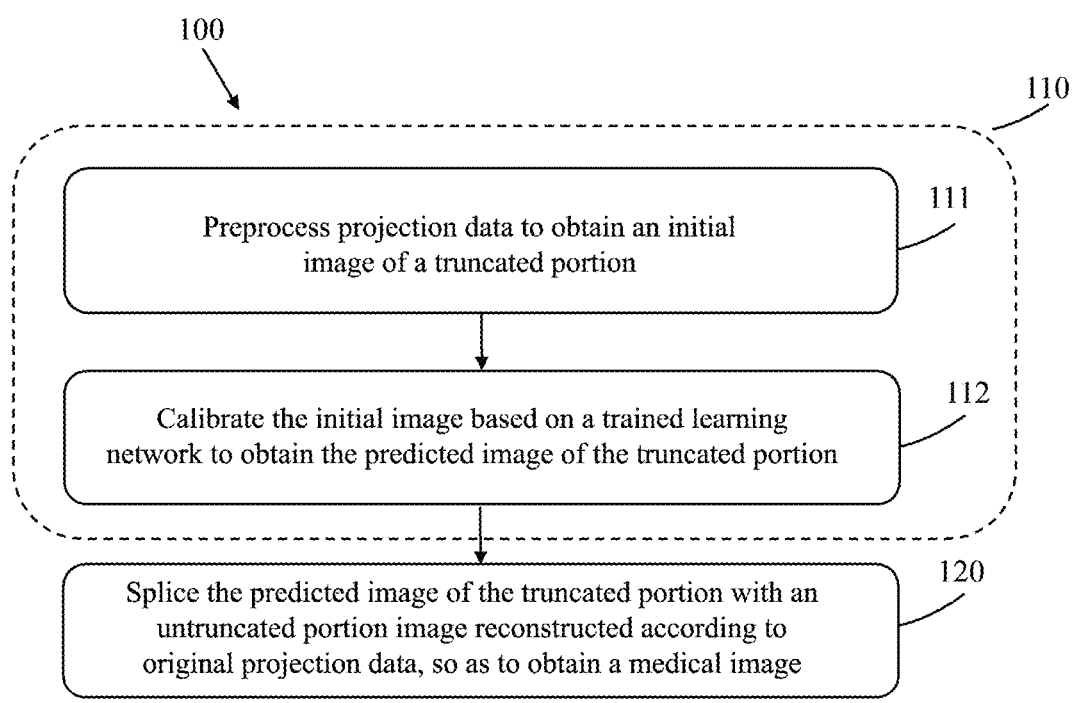
FIG. 1 is a flowchart of an imaging method according to some embodiments of the present invention.

Specific implementation manners of the present invention will be described in the following. It should be noted that during the specific description of the implementation manners, it is impossible to describe all features of the actual implementation manners in detail in this description for the sake of brief description. It should be understood that in the actual implementation of any of the implementation manners, as in the process of any engineering project or design project, a variety of specific decisions are often made in order to achieve the developer's specific objectives and meet system-related or business-related restrictions, which will vary from one implementation manner to another. Moreover, it can also be understood that although the efforts made in such development process may be complex and lengthy, for those of ordinary skill in the art related to content disclosed in the present invention, some changes in design, manufacturing, production or the like based on the technical content disclosed in the present disclosure are only conventional technical means, and should not be construed as that the content of the present disclosure is insufficient.

Unless otherwise defined, the technical or scientific terms used in the claims and the description are as they are usually understood by those of ordinary skill in the art to which the present invention pertains. The words "first," "second" and similar words used in the description and claims of the patent application of the present invention do not denote any order, quantity or importance, but are merely intended to distinguish between different constituents. "One," "a" and similar words are not meant to be limiting, but rather denote the presence of at least one. The word "include," "comprise" or a similar word is intended to mean that an element or article that appears before "include" or "comprise" encompasses an element or article and equivalent elements that are listed after "include" or "comprise," and does not exclude other elements or articles. The word "connect," "connected" or a similar word is not limited to a physical or mechanical connection, and is not limited to a direct or indirect connection.

As used in the present invention, the term "detected object" may include any object being imaged. The terms "projection data" and "projection image" represent the same meaning.

In some embodiments, during CT scanning, when a detected object has a large size or is placed in a special position, a portion exceeds a scanning field (SFOV) of CT, acquired projection data has truncation, and a reconstructed image is also distorted. The method and system for obtaining a predicted image of a truncated portion in some embodiments of the present invention can predict an image of a truncated portion more accurately based on artificial intelligence, so as to provide a better basis for diagnosis and/or treatment provided by doctors. It should be noted that from the perspective of those of ordinary skill in the art or related art, such description should not be construed as limiting the present invention only to a CT system. In fact, the method and system for obtaining a predicted image of a truncated portion described here may be reasonably applied to other imaging fields in medical fields or non-medical fields, such as X-ray systems, PET systems, SPECT systems, MR systems, or any combination thereof.

As discussed herein, artificial intelligence (including a deep learning technology, where the deep learning technology is also known as deep machine learning, hierarchical learning, deep structured learning, or the like) employs an artificial neural network for learning. The deep learning method is characterized by using one or a plurality of network architectures to extract or simulate one type of data of interest. The deep learning method may be implemented using one or a plurality of processing layers (for example, a convolutional layer, an input layer, an output layer, or a normalized layer, which may have different functional layers according to different deep learning network models), where the configuration and number of the layers allow a deep learning network to process complex information extraction and modeling tasks. Specific parameters (which may also be known as "weight" or "offset") of the network are usually estimated through a so-called learning process (or training process), though in some embodiments, the learning process itself may also extend to learning elements of a network architecture. The learned or trained parameters usually result in (or output of) a network corresponding to layers of different levels, so that extraction or simulation of different aspects of initial data or the output of a previous layer usually may represent the hierarchical structure or concatenation of layers. During image processing or reconstruction, this output may be represented as different layers with respect to different feature levels or resolutions in the data. Thus, processing may be performed layer by layer. That is, an earlier or higher-level layer may correspond to extraction of "simple" features from input data and then these simple features are combined into a layer exhibiting features of higher complexity. In practice, each layer (or more specifically, each "neuron" in each layer) may process input data as output data representation using one or a plurality of linear and/or non-linear transformations (so-called activation functions). The number of the plurality of "neurons" may be constant between the plurality of layers or may vary from layer to layer.

As discussed herein, as part of initial training of a deep learning process to solve a specific problem, a training data set having a known input value (for example, an input image or a pixel matrix of the image subjected to coordinate transformation) and a known or expected value may be used to obtain a final output (for example, a target image or a pixel matrix of the image subjected to coordinate transformation) of the deep learning process or various layers of the deep learning process (assuming a multi-layer network architecture). In this manner, a deep learning algorithm can process a known or training data set (in a supervised or guided manner or an unsupervised or unguided manner), until a mathematical relationship between initial data and an expected output is identified and/or a mathematical relationship between the input and output of each layer is identified and represented. (Partial) input data is usually used, and a network output is created for the input data in the learning process. Afterwards, the created output is compared with the expected (target) output of the data set, and then a generated difference from the expected output is used to iteratively update network parameters (weight and offset). One such update/learning mechanism uses a stochastic gradient descent (SGD) method to update network parameters. Certainly, those skilled in the art should understand that other methods known in the art may also be used. Similarly, a separate validation data set may be used, where both an input and an expected target value are known, but only an initial value is provided to a trained deep learning algorithm, and then an output is compared with an output of the deep learning algorithm to validate prior training and/or prevent excessive training.

Figure 2:
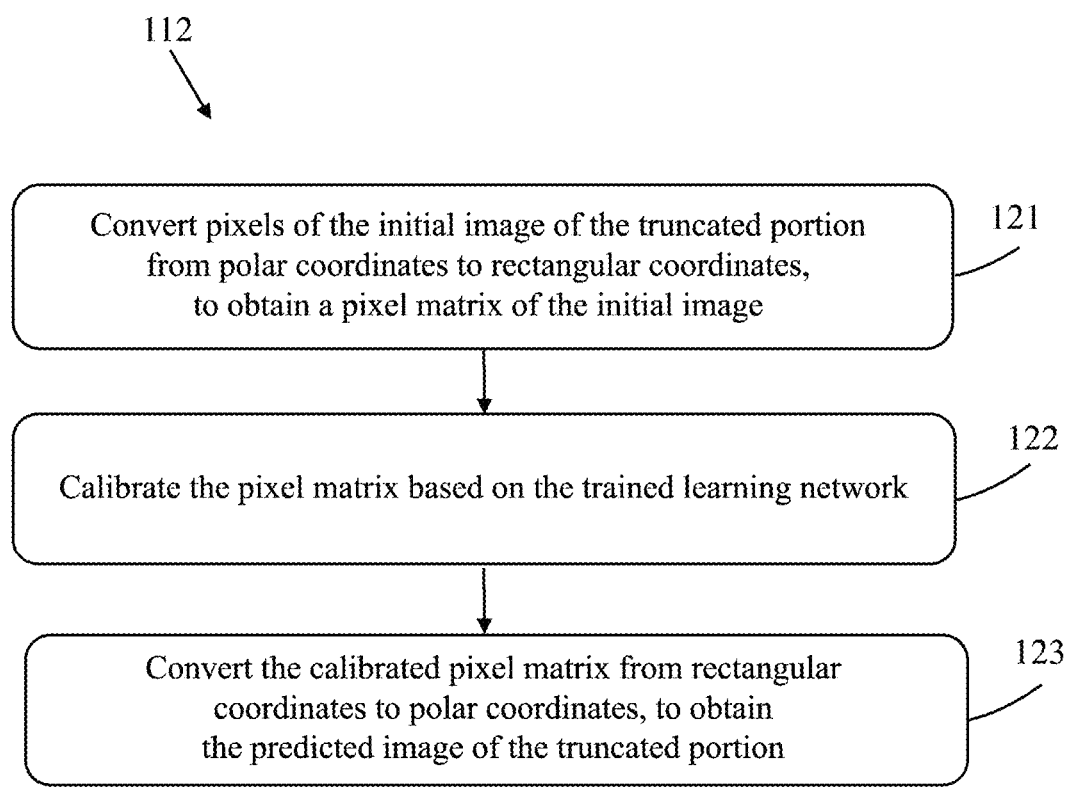
FIG. 2 is a flowchart of a step of calibrating an initial image based on a trained learning network to obtain a predicted image of a truncated portion in the method shown in FIG. 1.
Figure 3:
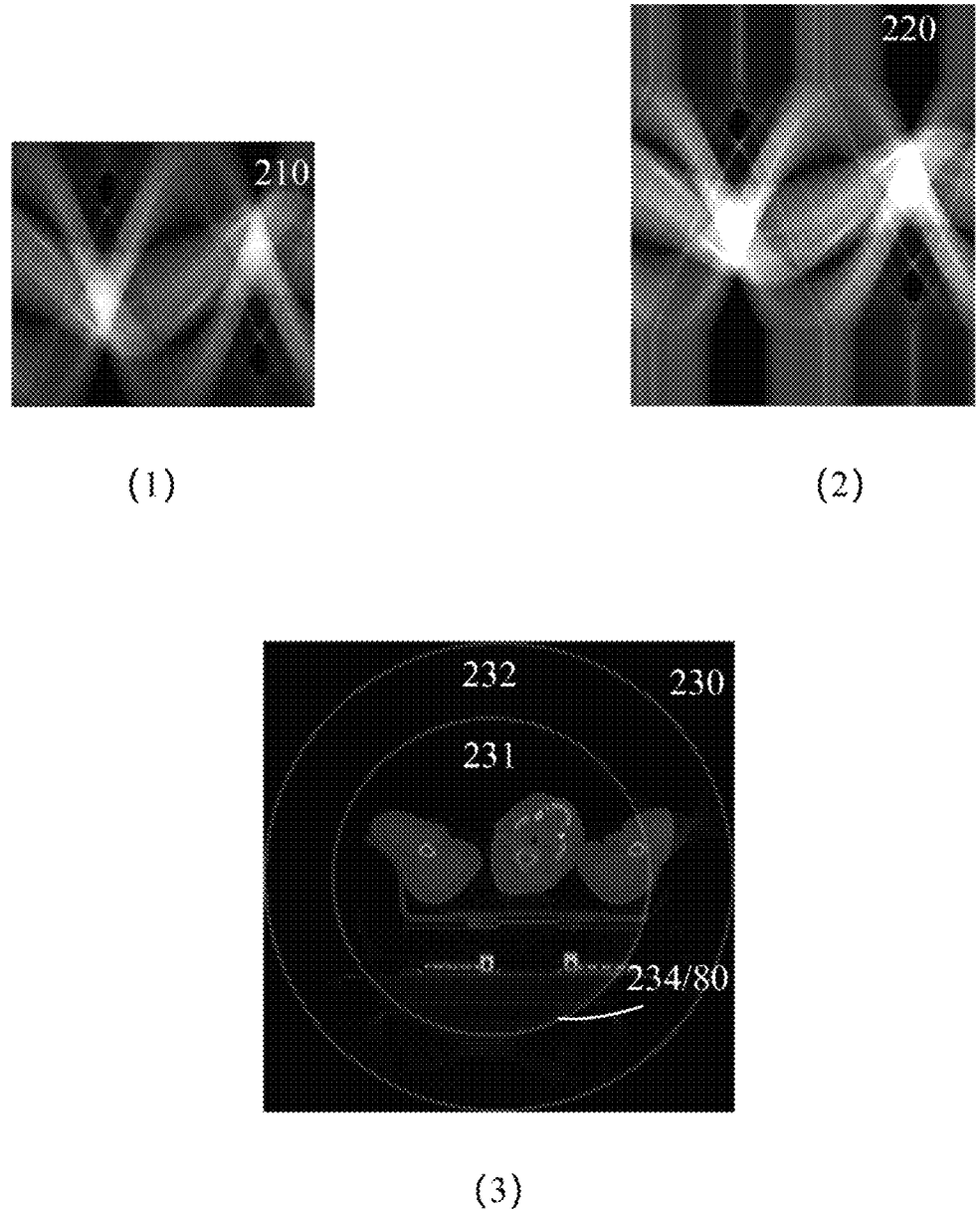
FIG. 3 shows some intermediate images in the preprocessing of a projection in the method shown in FIG. 1, where image (1) shows a projection with data truncation, image (2) shows a simulated projection obtained by padding a truncated portion of the projection in (1), and image (3) shows a CT image obtained by performing image reconstruction on the simulated projection in (2)
Figure 4:
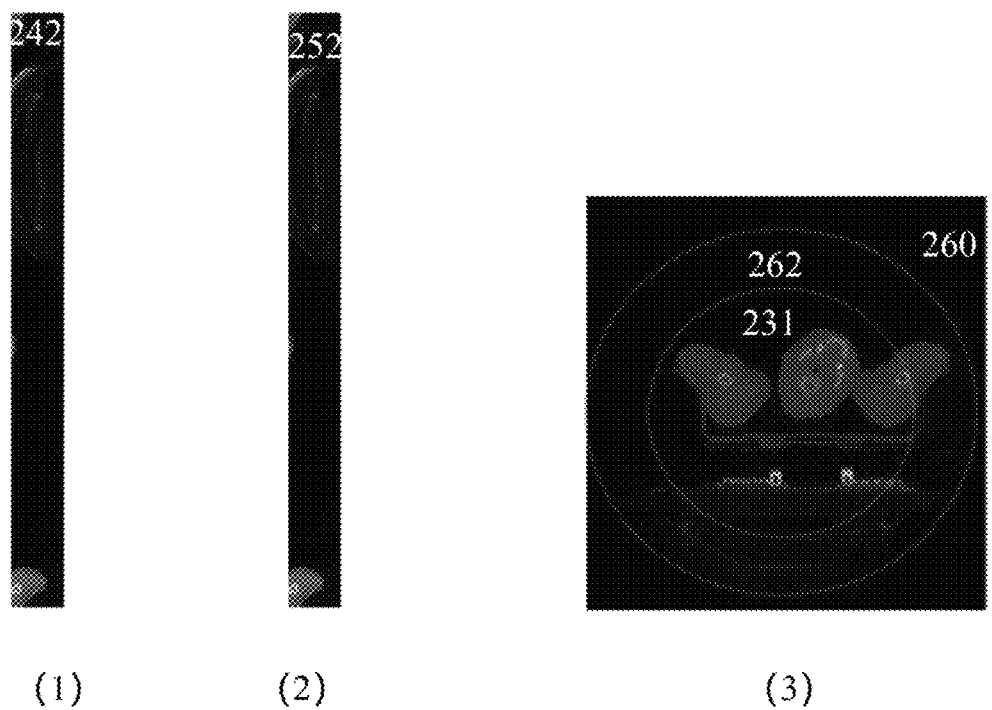
FIG. 4 shows some intermediate images in the step shown in FIG. 2, where image (1) shows a rectangular coordinate pixel matrix corresponding to the truncated portion, image (2) shows a predicted pixel matrix obtained from the rectangular coordinate transformed image in (1) through the learning network, and image (3) shows a predicted image obtained after inverse coordinate transformation is performed on the predicted pixel matrix in (2)

FIG. 1 is a schematic diagram of an imaging method 100 according to some embodiments of the present invention. FIG. 2 is a flowchart of step 112 of calibrating an initial image based on a trained learning network to obtain a predicted image of a truncated portion in the method 100 shown in FIG. 1. FIG. 3 shows some intermediate images in the preprocessing of the projection data in the method shown in FIG. 1, where image (1) shows a projection with data truncation, image (2) shows a simulated projection obtained by padding a truncated portion of the projection in (1), and image (3) shows a CT image obtained by performing image reconstruction on the simulated projection in (2). FIG. 4 shows some intermediate images in the method shown in FIG. 2, where image (1) shows a rectangular coordinate pixel matrix corresponding to the truncated portion, image (2) shows a predicted pixel matrix obtained from the rectangular coordinate pixel matrix in (1) through the learning network, and image (3) shows a predicted image obtained after inverse coordinate transformation is performed on the predicted pixel matrix in (2).

As shown in FIGS. 1 to 4, the imaging method in some embodiments of the present invention includes a method 110 for obtaining a predicted image of a truncated portion, where the method 110 for obtaining a predicted image of a truncated portion includes steps 111 and 112.

Step 111: preprocess projection data to obtain, by reconstruction, an initial image of the truncated portion.

In some embodiments, the preprocessing projection data includes padding the truncated portion of the projection data. Data of X-rays passing through a detected object is acquired, so that projection data (namely, a projection) 210 shown in image (1) of FIG. 3 can be obtained. Since a portion of the detected object exceeds a scanning field of a CT system, the obtained projection data 210 has data truncation. The projection data may be preprocessed to simulate a truncated portion of the projection data. Preferably, the padding the truncated portion of the projection data includes padding the truncated portion with projection data information at a boundary (an outermost channel) of the untruncated portion, and further, padding a truncated portion of each channel with projection data information at a boundary (an outermost channel) of an untruncated portion of the corresponding channel, as shown in image (2) of FIG. 3, which is simulated projection data 220 obtained by padding.

Although the truncated portion is simulated by a padding method in some embodiments of the present invention, those skilled in the art should know that the truncated portion may be simulated in other manners; for example, projection data information of the truncated portion is calculated based on projection data information of the untruncated portion according to a mathematical model. Furthermore, although the truncated portion is padded with the projection data information at the boundary of the untruncated portion in some embodiments of the present invention, those skilled in the art should know that the embodiments of the present invention are not limited to such a padding manner, and the truncated portion may also be padded in other manners; for example, the truncated portion is fully or partially padded with a CT value of a specific tissue or a preset CT value (for example, 0) or projection data information or the like, and further, if the obtained projection data has data missing or the like, data may also be padded using the same padding method. Furthermore, although preprocessing in some embodiments of the present invention includes padding the truncated portion, those skilled in the art should understand that the preprocessing not only includes this step, but also may include any data preprocessing operation performed prior to image reconstruction.

In some embodiments, after the projection data is preprocessed, image reconstruction is performed on the padded projection data to obtain a CT image. As shown in image (3) of FIG. 3, the CT image 230 is obtained after image reconstruction is performed on projection data of image (2) 220 (including the untruncated portion and the simulated truncated portion) in FIG. 3. The CT image 230 includes an untruncated portion image 231 and a truncated portion image 232. That is, the portion within a scanning field 80 is the truncated portion image 231, and the portion outside the scanning field 80 is the truncated portion image 232, and the boundary of the scanning field 80 is a junction between the untruncated portion 231 and the truncated portion 232. The image reconstruction algorithm may include, for example, a back projection (FBP) reconstruction method, an adaptive statistical iterative reconstruction (ASIR) method, a conjugate gradient (CG) method, a maximum likelihood expectation maximization (MLEM) method, and a model-based iterative reconstruction (MBIR) method.

In some embodiments, step 111 further includes extracting the CT image obtained by image reconstruction to obtain an initial image of the truncated portion, for example, the portion 232 shown in image (3) of FIG. 3. In some embodiments, although the initial image of the truncated portion in the present invention represents the image of the portion outside the scanning field, those skilled in the art should know that image extraction is not limited to extracting the image of the portion at and outside the scanning field, and may also include an image of at least part of the untruncated portion, which may be adjusted as needed in actual operation.

Still referring to FIG. 1, as shown in FIG. 1, the method 110 for obtaining a predicted image of a truncated portion in some embodiments of the present invention further includes step 112.

Step 112: calibrate the initial image of the truncated portion based on a trained learning network to obtain the predicted image of the truncated portion.

A virtual distorted image (a known input value) of the truncated portion of a certain amount of data and a comparison image (an expected output value), or a pixel matrix (a known input value) corresponding to the virtual distorted image of the truncated portion and a pixel matrix (an expected output value) corresponding to the comparison image are input, and a learning network is constructed or trained based on a deep learning method, so as to obtain a mathematical relationship between the known input value and the expected output value. Based on this, in actual operation, when a known image of the truncated portion (for example, the initial image 232 of the truncated portion mentioned above) is input, an expected image (namely, the expected output value-comparison image) of the truncated portion can be obtained based on the learning network. Training, construction, and data preparation for the learning network will be further described with reference to FIG. 5 and FIG. 6. In some embodiments, training of the learning network in the present invention is based on some network models known in the art (for example, Unet).

Referring to FIG. 2, in some embodiments, the calibrating the initial image of the truncated portion based on a trained learning network to obtain the predicted image of the truncated portion (step 112) includes step 121, step 122, and step 123.

Step 121: convert pixels of the initial image of the truncated portion from polar coordinates to rectangular coordinates, to obtain a pixel matrix of the initial image. For example, coordinate transformation from polar coordinates to rectangular coordinates is performed on the initial image (for example, the portion 232 in image (3) of FIG. 3) of the truncated portion, so that a rectangular coordinate pixel matrix 242 shown in image (1) of FIG. 4 can be obtained.

Step 122: calibrate the aforementioned pixel matrix based on the trained learning network. For example, the pixel matrix 242 in image (1) of FIG. 4 is inputted to the learning network, so that a calibrated comparison pixel matrix 252 shown in image (2) of FIG. 4 can be obtained.

Step 123: convert the calibrated pixel matrix from rectangular coordinates to polar coordinates, to obtain the predicted image of the truncated portion. For example, the calibrated pixel matrix (as shown by 252 in image (2) of FIG. 4) is converted from rectangular coordinates to polar coordinates, so that the predicted image 262 (as shown by image (3) in FIG. 4) of the truncated portion can be obtained.

Still referring to FIG. 1, as shown in FIG. 1, the imaging method in some embodiments of the present invention further includes step 120.

Step 120: splice the predicted image of the truncated portion with an untruncated portion image reconstructed according to original projection data, so as to obtain a medical image. For example, a complete CT image 260 can be obtained by splicing or synthesizing the predicted image of the truncated portion with the untruncated portion 231 in the CT image 230, where the untruncated portion image 231 is reconstructed based on initial projection data.

Figure 5:
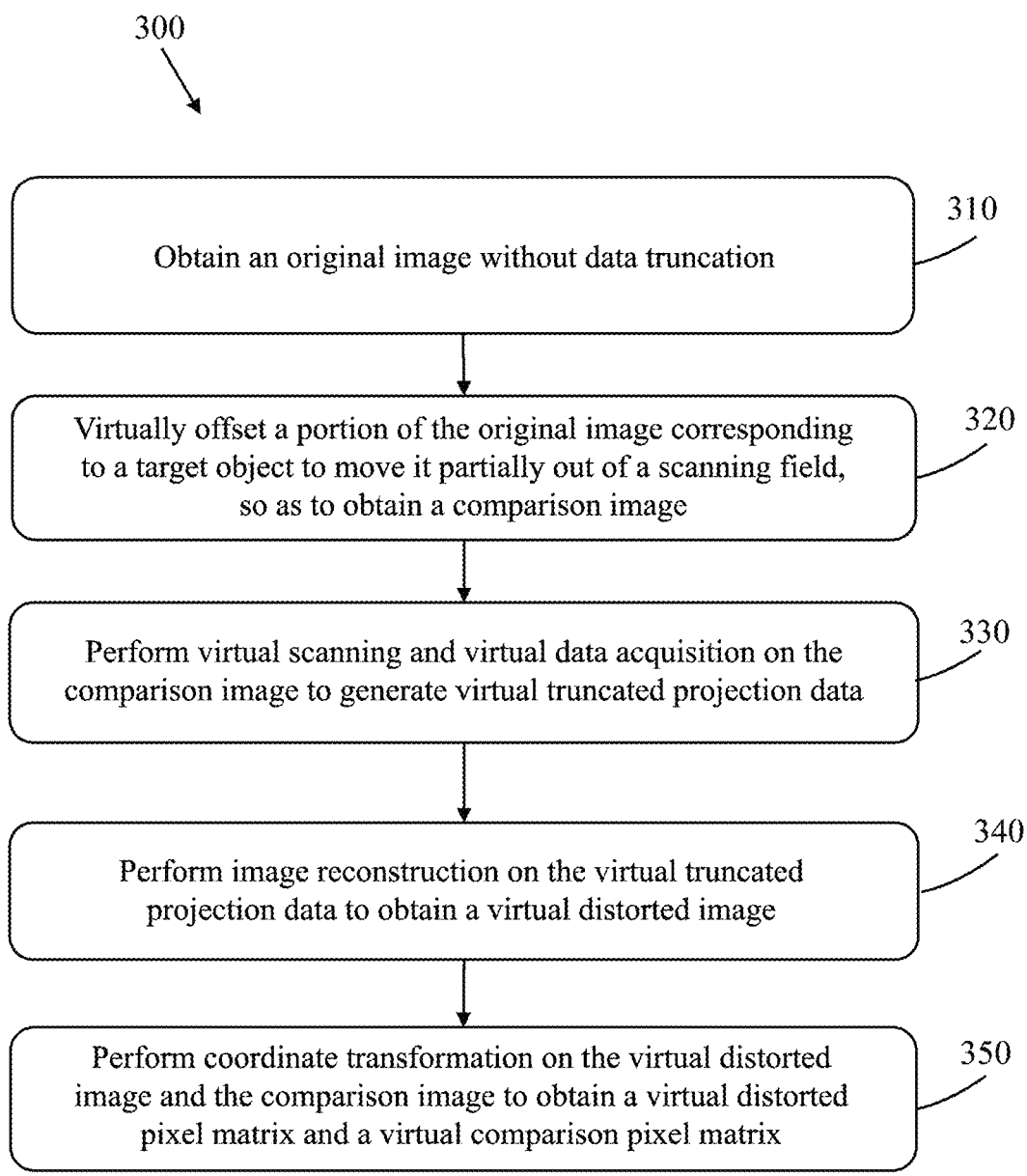
FIG. 5 is a flowchart of a training data preparation method for a learning network according to some embodiments of the present invention.

FIG. 5 is a flowchart of a training data preparation method 300 for a learning network according to some embodiments of the present invention. As shown in FIG. 5, the training data preparation method 300 for a learning network includes step 310, step 320, step 330, and step 340.

Step 310: obtain an original image without data truncation. In some embodiments, the initial image is reconstructed based on projection data, and when all portions of the detected object are within the scanning field, the obtained projection data does not have data truncation.

Step 320: virtually offset a portion of the original image corresponding to a target object to move it partially out of a scanning field, so as to obtain a comparison image. In some embodiments, the comparison image represents a complete CT image without truncation.

Step 330: perform virtual scanning and virtual data acquisition on the comparison image to generate virtual truncated projection data. In some embodiments, virtual scanning is performed on the comparison image based on a virtual sampling system. Since part of the target object moves out of the scanning field, this part of image will not be scanned, which is equivalent to virtual truncation.

Step 340: perform image reconstruction on the virtual truncated projection data to obtain a virtual distorted image. In some embodiments, the virtual distorted image represents a distorted image having data truncation.

Optionally, the data preparation method further includes step 350. Step 350: perform coordinate transformation (for example, transformation from polar coordinates to rectangular coordinates) on the virtual distorted image and the comparison image to obtain a virtual distorted pixel matrix and a virtual comparison pixel matrix. The aforementioned pixel matrices respectively serve as a known input value and an expected output value of a learning network to construct or train the learning network so as to better obtain a predicted image of the truncated portion.

Figure 6:
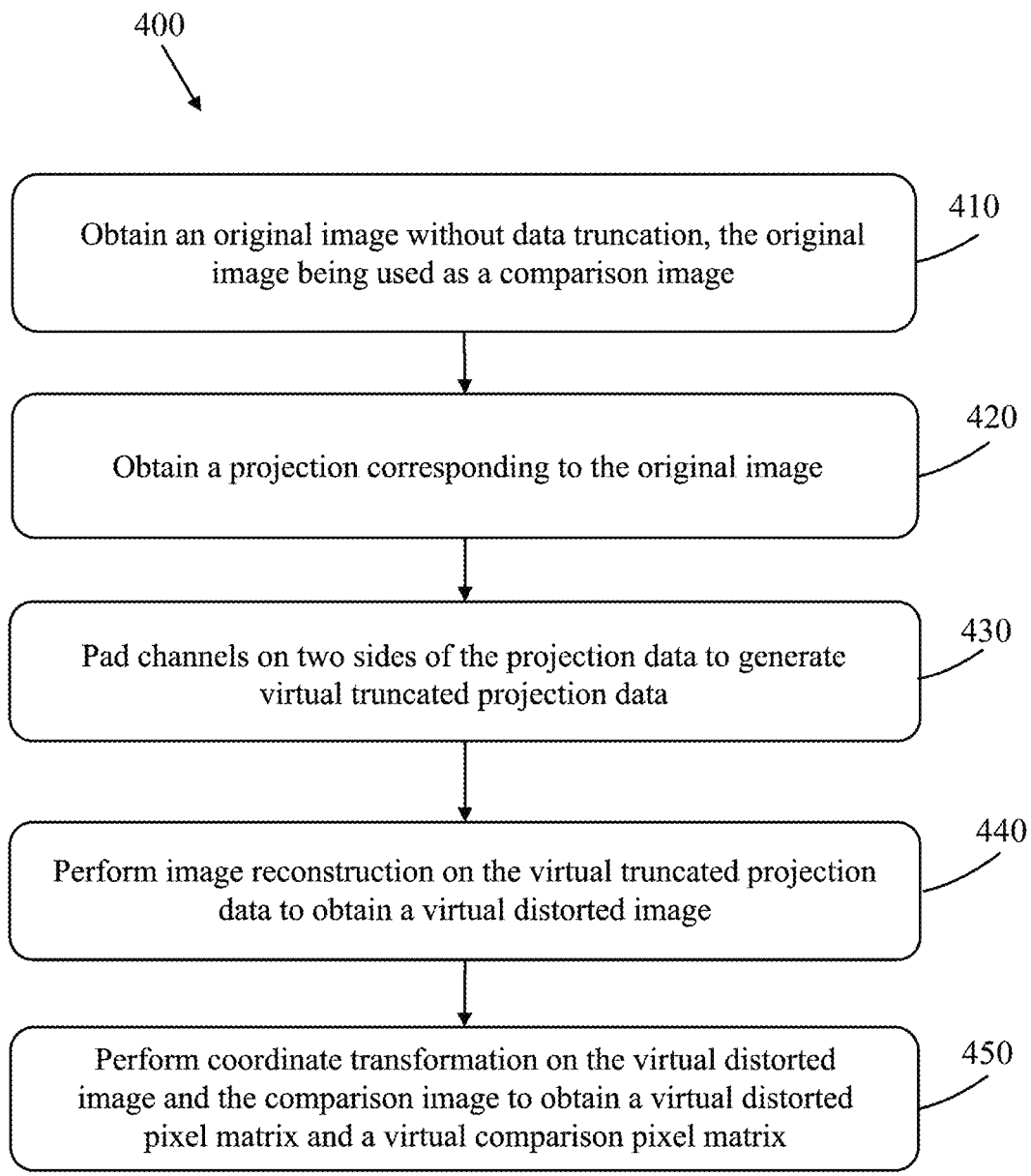
FIG. 6 is a flowchart of a training data preparation method for a learning network according to some other embodiments of the present invention.

FIG. 6 is a flowchart of a training data preparation method for a learning network according to some other embodiments of the present invention. As shown in FIG. 6, the training data preparation method 400 for a learning network includes step 410, step 420, step 430, and step 440.

Step 410: obtain an original image without data truncation, the original image being used as a comparison image.

Step 420: obtain projection data corresponding to the original image. In some embodiments, the original image (namely, the comparison image) is kept within a scanning field, and forward projection is performed on the original image to obtain a projection (namely, projection data) of the original image. In some other embodiments, original projection data obtained from the initial scan may be directly used as the projection (namely, projection data).

Step 430: pad channels on two sides of the projection data to generate virtual truncated projection data. The channels on two sides include channels on upper and lower sides, and may also include channels on left and right sides, which depend on the direction of the projection image. In some embodiments, the padding in step 430 is the same as the padding method for preprocessing the initial image (step 110 described before). Similarly, when the initial image is preprocessed using other methods than padding, the same method is also used for processing in step 430.

Step 440: perform image reconstruction on the virtual truncated projection data to obtain a virtual distorted image.

Optionally, the data preparation method further includes step 450. Step 450: perform coordinate transformation (for example, transformation from polar coordinates to rectangular coordinates) on the virtual distorted image and the comparison image to obtain a virtual distorted pixel matrix and a virtual comparison pixel matrix. The aforementioned pixel matrices respectively serve as a known input value and an expected output value of a learning network to construct or train the learning network so as to better obtain a predicted image of the truncated portion.

Although two embodiments of training data preparation for a learning network have been described above, this does not mean that the present invention can only employ such two manners to simulate data truncation. Other manners may also be employed to simulate data truncation to simultaneously obtain the virtual distorted image (known input value) and the comparison image (expected output value) required for AI network learning.

The method for obtaining a predicted image of a truncated portion based on artificial intelligence provided in the present invention can more accurately predict projection data and/or an image of a portion exceeding a scanning field (namely, a truncated portion), and restore the lines and boundary of a detected object more accurately, so that the radiation dose which should be applied to a patient can be judged more accurately, thereby providing a solid foundation for radiotherapy. The truncated portion is padded to obtain an initial image of the truncated portion (preprocessing step 110) or virtual truncated projection data of the truncated portion (step 430 in data preparation), so that a learning network can be better and more accurately constructed, thereby improving truncated portion prediction accuracy. Furthermore, coordinate transformation is performed on the initial image of the truncated portion to transform it from an initial annular image to a matrix image in rectangular coordinates, which can also improve learning network prediction accuracy to obtain a more accurate predicted image.

Figure 7:
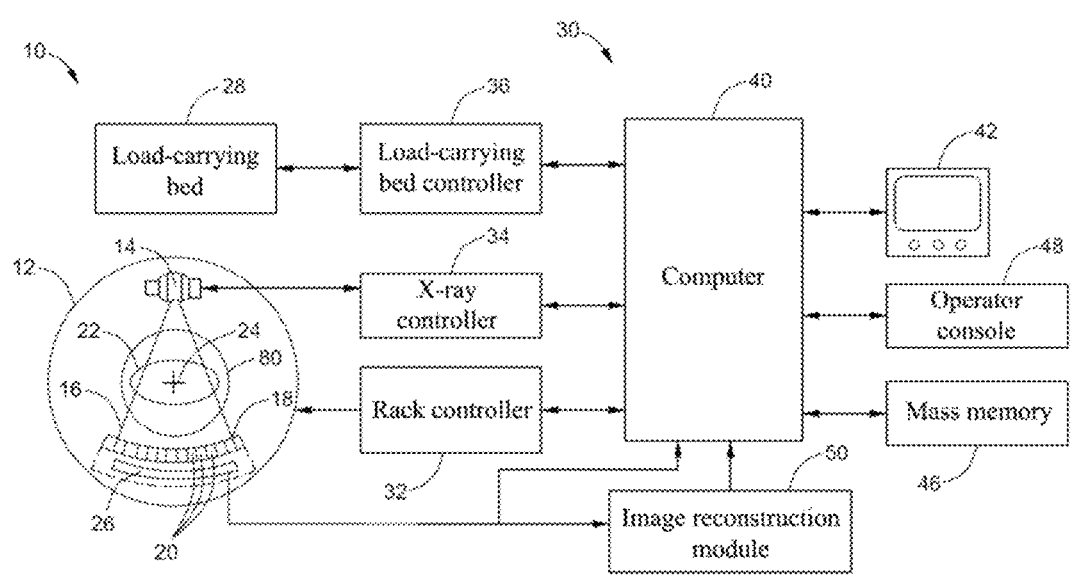
FIG. 7 is a schematic diagram of a CT system according to some embodiments of the present invention.

FIG. 7 is a schematic diagram of a CT system 10 according to some embodiments of the present invention. As shown in FIG. 7, the system 10 includes a rack 12. An X-ray source 14 and a detector array 18 are disposed opposite to each other on the rack 12. The detector array 18 is formed by a plurality of detectors 20 and a data acquisition system (DAS) 26. The DAS 26 is configured to convert sampled analog data of analog attenuation data received by the plurality of detectors 20 into digital signals for subsequent processing. In some embodiments, the system 10 is used for acquiring projection data of a detected object at different angles. Thus, components on the rack 12 are used for rotating around a rotation center 24 to acquire projection data. During rotation, the X-ray radiation source 14 is configured to project X-rays 16 that penetrate the detected object toward the detector array 18. The attenuated X-ray beam data is preprocessed and then used as projection data of a target volume of the object. An image of the detected object may be reconstructed based on the projection data. The reconstructed image may display internal features of the detected object. These features include, for example, the lesion, size, and shape of a body tissue structure. The rotation center 24 of the rack also defines a center of a scanning field 80.

The system 10 further includes an image reconstruction module 50. As described above, the DAS 26 samples and digitizes the projection data acquired by the plurality of detectors 20. Next, the image reconstruction module 50 performs high-speed image reconstruction based on the aforementioned sampled and digitized projection data. In some embodiments, the image reconstruction module 50 stores the reconstructed image in a storage apparatus or a mass memory 46. Or, the image reconstruction module 50 transmits the reconstructed image to a computer 40 to generate information for diagnosing and evaluating patients.

Although the image reconstruction module 50 is illustrated as a separate entity in FIG. 7, in some embodiments, the image reconstruction module 50 may form part of the computer 40. Or, the image reconstruction module 50 may not exist in the system 10, or the computer 40 may perform one or a plurality of functions of the image reconstruction module 50. Furthermore, the image reconstruction module 50 may be located at a local or remote location and may be connected to the system 10 using a wired or wireless network. In some embodiments, computing resources with a centralized cloud network may be used for the image reconstruction module 50.

In some embodiments, the system 10 includes a control mechanism 30. The control mechanism 30 may include an X-ray controller 34 configured to provide power and timing signals to the X-ray radiation source 14. The control mechanism 30 may further include a rack controller 32 configured to control a rotational speed and/or position of the rack 12 based on imaging requirements. The control mechanism 30 may further include a load-carrying bed controller 36 configured to drive a load-carrying bed 28 to move to a suitable location so as to position the detected object in the rack 12, thereby acquiring the projection data of the target volume of the detected object. Furthermore, the load-carrying bed 28 includes a driving device, where the load-carrying bed controller 36 may control the driving device to control the load-carrying bed 28.

In some embodiments, the system 10 further includes the computer 40, where data sampled and digitized by the DAS 26 and/or an image reconstructed by the image reconstruction module 50 is transmitted to a computer or the computer 40 for processing. In some embodiments, the computer 40 stores the data and/or image in a storage apparatus such as a mass memory 46. The mass memory 46 may include a hard disk drive, a floppy disk drive, a CD-read/write (CD-R/W) drive, a digital versatile disc (DVD) drive, a flash drive, and/or a solid-state storage device. In some embodiments, the computer 40 transmits the reconstructed image and/or other information to a display 42, where the display 42 is communicatively connected to the computer 40 and/or the image reconstruction module 50. In some embodiments, the computer 40 may be connected to a local or remote display, printer, workstation and/or similar apparatus, for example, connected to such apparatuses of medical institutions or hospitals, or connected to a remote apparatus through one or a plurality of configured wires or a wireless network such as the Internet and/or a virtual private network.

Furthermore, the computer 40 may provide commands and parameters to the DAS 26 and the control mechanism 30 (including the rack controller 32, the X-ray controller 34, and the load-carrying bed controller 36) based on user provision and/or system definition, so as to control system operation, for example, data acquisition and/or processing. In some embodiments, the computer 40 controls system operation based on user input. For example, the computer 40 may receive user input such as commands, scanning protocols and/or scanning parameters, through an operator console 48 connected thereto. The operator console 48 may include a keyboard (not shown) and/or touch screen to allow a user to input/select commands, scanning protocols and/or scanning parameters. Although FIG. 7 exemplarily shows only one operator console 48, the computer 40 may be connected to more operating consoles, for example, for inputting or outputting system parameters, requesting medical examination and/or viewing images.

In some embodiments, the system 10 may include or be connected to an image storage and transmission system (PACS) (not shown in the figure). In some embodiments, the PACS is further connected to a remote system such as a radiology information system, a hospital information system, and/or an internal or external network (not shown) to allow operators at different locations to provide commands and parameters and/or access image data.

The method or process described further below may be stored as executable instructions in a non-volatile memory in a computing apparatus of the system 10. For example, the computer 40 may include the executable instructions in the non-volatile memory, and may use the method described herein to automatically perform part or all of the scanning process, for example, select suitable protocols and determine suitable parameters. As another example, the image reconstruction module 50 may include the executable instructions in the non-volatile memory, and may use the method described herein to perform image reconstruction tasks.

The computer 40 may be configured and/or arranged for use in different manners. For example, in some implementations, a single computer 40 may be used; in other implementations, a plurality of computers 40 are configured to work together (for example, based on distributed processing configuration) or separately, where each computer 40 is configured to handle specific aspects and/or functions, and/or process data for generating models used only for a specific medical imaging system 10. In some implementations, the computer 40 may be local (for example, in the same place as one or a plurality of medical imaging systems 10, for example, in the same facility and/or the same local network); in other implementations, the computer 40 may be remote and thus can only be accessed via a remote connection (for example, via the Internet or other available remote access technologies). In a specific implementation, the computer 40 may be configured in a manner similar to that of cloud technology, and may be accessed and/or used in a manner substantially similar to that of accessing and using other cloud-based systems.

Once data (for example, a trained learning network) is generated and/or configured, the data can be replicated and/or loaded into the medical imaging system 10, which may be accomplished in a different manner. For example, models may be loaded via a directional connection or link between the medical imaging system 10 and the computer 40. In this regard, communication between different elements may be accomplished using an available wired and/or wireless connection and/or based on any suitable communication (and/or network) standard or protocol. Alternatively or additionally, the data may be indirectly loaded into the medical imaging system 10. For example, the data may be stored in a suitable machine-readable medium (for example, a flash memory card), and then the medium is used to load the data into the medical imaging system 10 (for example, by a user or an authorized person of the system on site); or the data may be downloaded to an electronic apparatus (for example, a notebook computer) capable of local communication, and then the apparatus is used on site (for example, by a user or an authorized person of the system) to upload the data to the medical imaging system 10 via a direct connection (for example, a USB connector).

Figure 8:
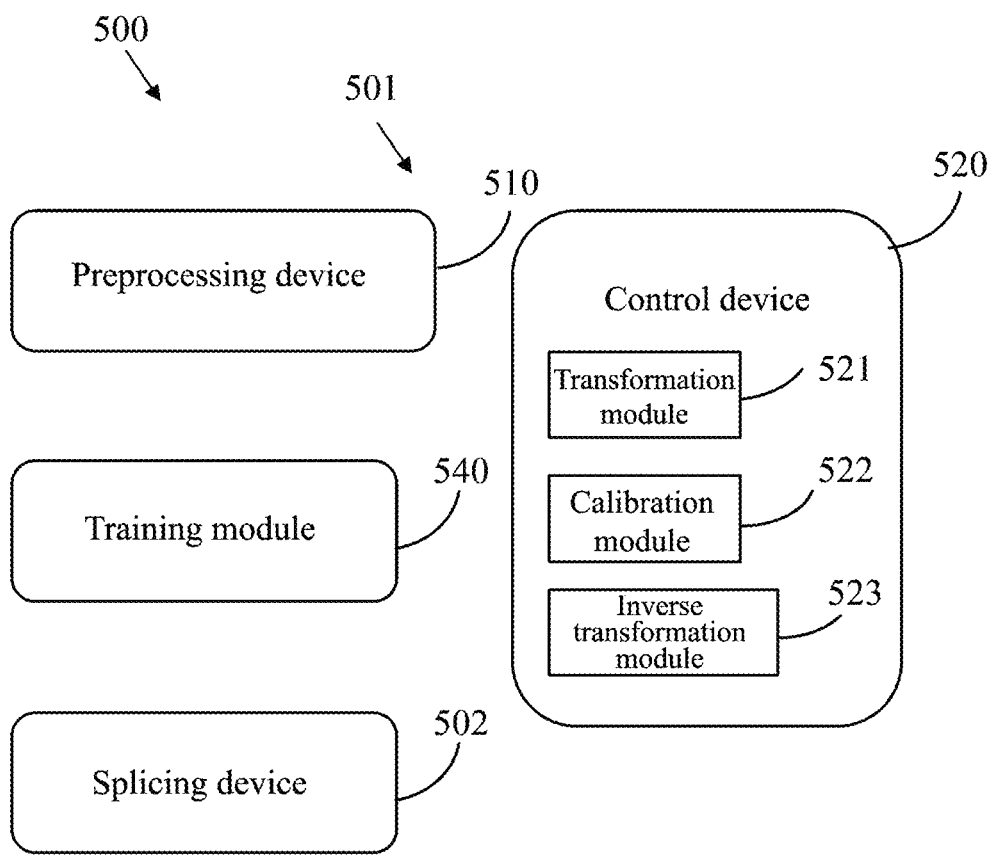
FIG. 8 is a schematic diagram of an imaging system including a device for obtaining a predicted image of a truncated portion according to some embodiments of the present invention.

FIG. 8 shows an imaging system 500 including a device for obtaining a predicted image of a truncated portion according to some embodiments of the present invention. As shown in FIG. 8, the imaging system 500 includes a device 501 for obtaining a predicted image of a truncated portion.

The device 501 for obtaining a predicted image of a truncated portion includes a preprocessing device 510 and a control device 520. The preprocessing device 510 is configured to preprocess projection data to obtain, by reconstruction, an initial image of the truncated portion, and the control device 520 is configured to calibrate the initial image based on a trained learning network to obtain the predicted image of the truncated portion.

In some embodiments, the preprocessing device 510 includes a padding module (not shown in the figure). The padding module is configured to pad the truncated portion of the projection data. Furthermore, the padding module is further configured to pad the truncated portion with projection data information at a boundary (an outermost channel) of the untruncated portion and, preferably, pad a truncated portion of each channel with projection data information at a boundary (an outermost channel) of an untruncated portion of the corresponding channel.

In some embodiments, the preprocessing device 510 further includes an image reconstruction module (not shown in the figure). The image reconstruction module is configured to perform image reconstruction on projection data subjected to preprocessing (for example, padding). In some embodiments, the image reconstruction module is the image reconstruction module 50 in the CT system 10 shown in FIG. 7. In some other embodiments, the preprocessing device 510 is connected to the image reconstruction module 50 of the CT system in a wired or wireless manner (including a direct connection or an indirect connection through a computer). After the padding module pads the truncated portion of the projection data, the padding module (or the preprocessing device 510 or the device 501 for obtaining a predicted image of a truncated portion) may send the projection data after padding to the image reconstruction module 50, and after the image reconstruction module 50 completes reconstruction, a reconstructed CT image is sent to an image extraction module (or the preprocessing device 510 or the device 501 for obtaining a predicted image of a truncated portion).

Optionally, the preprocessing device 510 further includes an image extraction module (not shown in the figure). The image extraction module is configured to extract the reconstructed CT image to obtain the initial image of the truncated portion.

In some embodiments, the control device 520 includes a transformation module 521, a calibration module 522, and an inverse transformation module 523.

The transformation module 521 is configured to convert pixels of the initial image of the truncated portion from polar coordinates to rectangular coordinates, to obtain a pixel matrix of the initial image.

The calibration module 522 is configured to calibrate the pixel matrix based on the trained learning network. In some embodiments, the calibration module 522 is connected to a training module 540 in a wired or wireless manner (including a direct connection or an indirect connection through a computer). The training module 540 is configured to prepare a virtual distorted image and a comparison image in the learning network based on the methods shown in FIG. 5 and FIG. 6, and perform learning or training based on an existing deep learning network model (for example, Unet), so as to construct the learning network. In some embodiments, although the training module 540 in FIG. 8 is a separate module, those skilled in the art can understand that the training module 540 may be integrated in the control device or other modules or devices.

The inverse transformation module 523 is configured to convert the calibrated pixel matrix from rectangular coordinates to polar coordinates, to obtain the predicted image of the truncated portion.

The present invention may further provide a non-transitory computer-readable storage medium, for storing an instruction set and/or a computer program. When executed by a computer, the instruction set and/or computer program causes the computer to perform the aforementioned method for obtaining a predicted image of a truncated portion. The computer executing the instruction set and/or computer program may be a computer of a CT system, or may be other devices/modules of the CT system. In one embodiment, the instruction set and/or computer program may be programmed into a processor/controller of the computer.

Specifically, when executed by the computer, the instruction set and/or computer program causes the computer to:
preprocess projection data to obtain, by reconstruction, an initial image of the truncated portion; and
calibrate the initial image based on a trained learning network to obtain the predicted image of the truncated portion.

The instructions described above may be combined into one instruction for execution, and any of the instructions may also be split into a plurality of instructions for execution. Moreover, the instructions are not limited to the instruction execution order described above.

In some embodiments, the calibrating the initial image based on a trained learning network to obtain the predicted image of the truncated portion may include:
converting pixels of the initial image of the truncated portion from polar coordinates to rectangular coordinates, to obtain a pixel matrix of the initial image;
calibrating the pixel matrix based on the trained learning network; and converting the calibrated pixel matrix from rectangular coordinates to polar coordinates, to obtain the predicted image of the truncated portion.

In some embodiments, the instruction set and/or computer program further causes the computer to perform learning network training, and further includes the following instructions:
obtaining an original image without data truncation;
virtually offsetting a portion of the original image corresponding to a target object to move it partially out of a scanning field, so as to obtain the comparison image;
performing virtual scanning and virtual data acquisition on the comparison image to generate virtual truncated projection data; and
performing image reconstruction on the virtual truncated projection data to obtain the virtual distorted image.

Optionally, the following is further included:
performing coordinate transformation on the virtual distorted image and the comparison image to obtain a virtual distorted pixel matrix and a virtual comparison pixel matrix.

In some other embodiments, causing the computer to perform learning network training further includes the following instructions:
obtaining an original image without data truncation, the original image being used as the comparison image;
obtaining projection data corresponding to the original image;
padding channels on two sides of the projection data to generate virtual truncated projection data; and
performing image reconstruction on the virtual truncated projection data to obtain the virtual distorted image.

Optionally, the following is further included:
performing coordinate transformation on the virtual distorted image and the comparison image to obtain a virtual distorted pixel matrix and a virtual comparison pixel matrix.

As used herein, the term "computer" may include any processor-based or microprocessor-based system including a system that uses a microcontroller, a reduced instruction set computer (RISC), an application specific integrated circuit (ASIC), a logic circuit, and any other circuit or processor capable of executing the functions described herein. The above examples are merely exemplary and thus are not intended to limit the definition and/or meaning of the term "computer" in any way.

The instruction set may include various commands that instruct a computer acting as a processor or a processor to perform particular operations, such as the methods and processes of various embodiments. The instruction set may be in the form of a software program, and the software program can form part of one or a plurality of tangible, non-transitory computer-readable media. The software may be in various forms such as system software or application software. In addition, the software may be in the form of a set of independent programs or modules, a program module within a larger program, or part of a program module. The software may also include modular programming in the form of object-oriented programming. The input data may be processed by the processor in response to an operator command, or in response to a previous processing result, or in response to a request made by another processor.

Some exemplary embodiments have been described above; however, it should be understood that various modifications may be made. For example, if the described techniques are performed in a different order and/or if the components of the described system, architecture, apparatus, or circuit are combined in other manners and/or replaced or supplemented with additional components or equivalents thereof, a suitable result can be achieved. Accordingly, other implementation manners also fall within the protection scope of the claims.

The invention claimed is:

1. A method for obtaining a predicted image of a truncated portion, the method comprising:
preprocessing projection data to obtain, by reconstruction, an initial image of the truncated portion; and
calibrating the initial image based on a trained learning network to obtain the predicted image of the truncated portion, wherein the calibrating the initial image based on a trained learning network to obtain the predicted image of the truncated portion comprises:

converting pixels of the initial image of the truncated portion from polar coordinates to rectangular coordinates, to obtain a pixel matrix of the initial image;

calibrating the pixel matrix based on the trained learning network; and converting the calibrated pixel matrix from rectangular coordinates to polar coordinates, to obtain the predicted image of the truncated portion.

2. The method according to claim 1, wherein the preprocessing projection data comprises padding the truncated portion of the projection data.

3. The method according to claim 2, wherein the padding the truncated portion of the projection data comprises padding the truncated portion with projection data information at a boundary of an untruncated portion.

4. The method according to claim 3, wherein the padding the truncated portion with projection data information at a boundary of an untruncated portion comprises padding a truncated portion of each channel with projection data information at a boundary of an untruncated portion of the corresponding channel.

5. The method according to claim 1, wherein the trained learning network is obtained by training based on a virtual distorted image and a comparison image.

6. The method according to claim 5, wherein the trained learning network is obtained by training based on a pixel matrix of the virtual distorted image obtained by coordinate transformation and a pixel matrix of the comparison image obtained by coordinate transformation.

7. The method according to claim 5, wherein a method for obtaining the virtual distorted image and the comparison image comprises:

obtaining an original image without data truncation;

virtually offsetting a portion of the original image corresponding to a target object to move it partially out of a scanning field, so as to obtain the comparison image;

performing virtual scanning and virtual data acquisition on the comparison image to generate virtual truncated projection data; and performing image reconstruction on the virtual truncated projection data to obtain the virtual distorted image.

8. The method according to claim 5, wherein a method for obtaining the virtual distorted image and the comparison image comprises:

obtaining an original image without data truncation, the original image being used as the comparison image;

obtaining projection data corresponding to the original image;

padding channels on two sides of the projection data to generate virtual truncated projection data; and performing image reconstruction on the virtual truncated projection data to obtain the virtual distorted image.

9. An imaging method, comprising:

the method for obtaining a predicted image of a truncated portion according to claim 1; and splicing the predicted image of the truncated portion with an untruncated portion image reconstructed according to original projection data, so as to obtain a medical image.

10. A device for obtaining a predicted image of a truncated portion, the device comprising:

a preprocessing device, configured to preprocess projection data to obtain, by reconstruction, an initial image of the truncated portion; and a control device, configured to calibrate the initial image based on a trained learning network to obtain the predicted image of the truncated portion, wherein the control device comprises:

a transformation module, configured to convert pixels of the initial image of the truncated portion from polar coordinates to rectangular coordinates, to obtain a pixel matrix of the initial image;

a calibration module, configured to calibrate the pixel matrix based on the trained learning network; and an inverse transformation module, configured to convert the calibrated pixel matrix from rectangular coordinates to polar coordinates, to obtain the predicted image of the truncated portion.

11. The device according to claim 10, wherein the preprocessing device comprises a padding module, the padding module configured to pad the truncated portion of the projection data.

12. The device according to claim 11, wherein the padding module is further configured to pad the truncated portion with projection data information at a boundary of an untruncated portion.

* * * * *